United States Patent
Baldemair et al.

(10) Patent No.: US 10,159,023 B2
(45) Date of Patent: *Dec. 18, 2018

(54) NETWORK NODE, ACCESS NODES AND METHOD FOR ASSISTING USER EQUIPMENTS TO RECEIVE SIGNALS IN WIRELESS COMMUNICATION NETWORK

(71) Applicant: Telefonaktiebolaget LM Ericsson (publ), Stockholm (SE)

(72) Inventors: Robert Baldemair, Solna (SE); Bengt Lindoff, Bjarred (SE); Yngve Selen, Uppsala (SE); Anders Wallen, Ystad (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,629

(22) Filed: Sep. 29, 2017

(65) Prior Publication Data

US 2018/0041929 A1    Feb. 8, 2018

Related U.S. Application Data

(63) Continuation of application No. 15/113,434, filed as application No. PCT/EP2014/051224 on Jan. 22, 2014, now Pat. No. 9,801,106.

(51) Int. Cl.
*H04W 36/00*    (2009.01)
*H04W 72/12*    (2009.01)
(Continued)

(52) U.S. Cl.
CPC ...... *H04W 36/0088* (2013.01); *H04B 7/0617* (2013.01); *H04W 72/1289* (2013.01); *H04W 24/02* (2013.01)

(58) Field of Classification Search
CPC ................................................. H04W 36/0088
(Continued)

(56) References Cited

U.S. PATENT DOCUMENTS

2005/0272472 A1    12/2005  Goldberg et al.
2006/0189355 A1    8/2006   Cuffaro
(Continued)

FOREIGN PATENT DOCUMENTS

WO    9637969 A1    11/1996
WO    0051368 A2    8/2000
(Continued)

OTHER PUBLICATIONS

PCT International Search Report, dated Oct. 9, 2014, in connection with International Application No. PCT/EP2014/051224, all pages.
(Continued)

*Primary Examiner* — Joel Ajayi
(74) *Attorney, Agent, or Firm* — Sage Patent Group

(57) ABSTRACT

A method in a wireless communication network for assisting a user equipment to receive signals from a target access node. The wireless communication network comprises the target access node, the user equipment and a serving access node serving the user equipment. The serving access node sends information about time instances to the user equipment. The time instances are scheduled for sending signals from the target access node in a beam direction towards the user equipments. The time instances may be determined in the target access node based on its own position and a position of the user equipment and/or a beam direction of the serving access node. The time instances may also be determined in the serving access node based on its own position and a schedule of the target access node on beam directions versus transmission times. The user equipment receives signals from the target access node during the time instances
(Continued)

indicated in the received information. In this way, leaving more time for the user equipment to receive data or signal from the serving access node. As a result, the throughput of the wireless communication network is increased and improved.

3 Claims, 10 Drawing Sheets

(51) Int. Cl.
*H04B 7/06* (2006.01)
*H04W 24/02* (2009.01)

(58) Field of Classification Search
USPC .................................................. 455/436–448
See application file for complete search history.

(56) References Cited

U.S. PATENT DOCUMENTS

| 2011/0207494 | A1 | 8/2011 | Zhu et al. |
| 2012/0202477 | A1 | 8/2012 | Eriksson |
| 2013/0053079 | A1* | 2/2013 | Kwun .................... H04B 7/024 455/509 |
| 2013/0072247 | A1* | 3/2013 | Park ..................... H04B 7/0408 455/513 |

FOREIGN PATENT DOCUMENTS

| WO | 0105185 A1 | 1/2001 |
| WO | 2009137092 A1 | 11/2009 |
| WO | 2012115553 A1 | 8/2012 |

OTHER PUBLICATIONS

PCT Written Opinion, dated Oct. 9, 2014, in connection with International Application No. PCT/EP2014/051224, all pages.

* cited by examiner

NETWORK NODE, ACCESS NODES AND METHOD FOR ASSISTING USER EQUIPMENTS TO RECEIVE SIGNALS IN WIRELESS COMMUNICATION NETWORK

CROSS-REFERENCE TO RELATED APPLICATIONS

This application claims the benefit of U.S. application Ser. No. 15/113,434 filed Jul. 21, 2016 (371(c) date), which is a 35 U.S.C. § 371 national stage of international application PCT/EP2014/051224 filed Jan. 22, 2014. All of these earlier applications are hereby incorporated herein by reference in their entireties.

TECHNICAL FIELD

Embodiments herein relate to a network node, access nodes and user equipments, and methods therein. In particular, it relates to assisting the user equipments to receive signals from the access nodes in a wireless communication network.

BACKGROUND

Communication devices such as user equipments are also known as e.g. wireless terminals, mobile terminals and/or mobile stations. User equipments are enabled to communicate wirelessly in a cellular communications network or wireless communication system/network, sometimes also referred to as a cellular radio system or cellular network. The communication may be performed e.g. between two wireless terminals, between a wireless terminal and a regular telephone and/or between a wireless terminal and a server via a Radio Access Network (RAN) and possibly one or more core networks, comprised within the wireless communication network.

User equipments may further be referred to as mobile telephones, cellular telephones, laptops, tablet computers or phablets with wireless capability, sensors and actuators with wireless communication capabilities, just to mention some further examples. The user equipments in the present context may be, for example, stationary, portable, pocket-storable, hand-held, computer-comprised, or vehicle-mounted mobile devices, enabled to communicate voice and/or data, via the RAN, with another entity, such as another wireless terminal or a server.

The wireless communication network covers a geographical area which is divided into cell areas, wherein each cell area being served by an Access Node (AN) or a base station. The wireless communication network may include a number of cells that can support communications for a number of user equipments. A user equipment may communicate with a serving access node in a serving cell and may need to make measurements of other cells for various purposes. For example, for a user equipment to be able to monitor and eventually perform a handover to a neighbour cell, hereafter referred to as a target cell, the user equipment needs to receive signals from a target access node in the target cell, e.g. for mobility measurements, reading of system information or paging from the target cell, etc.

Wireless communication networks operating in millimeter wave frequencies typically apply transmit beamforming to enable link budgets for multi-Gbits/s transmissions. Beamforming is a signal processing technique used for directional signal transmission or reception. This is achieved by combining elements in a phased array in such a way that signals at particular angles experience constructive interference while others experience destructive interference. Beamforming can be used at both the transmitting and receiving ends in order to achieve spatial selectivity. The improvement compared with omnidirectional reception/transmission is known as the beamforming gain. Beamforming may be applied to physical channels used to transmit data to user equipments once their positions are known to the system. For broadcast transmissions, such as system information, paging, common reference signals, and synchronization etc. signals which are targeting user equipments not yet known to the network or user equipments which position is unknown to the network, it is a bit more tricky. Simple beamforming cannot be applied since it is not known in which direction to beamform. One common way around this problem is to transmit even those signals using beamforming but transmit them several times, each time into a different direction. This procedure is also called beam sweeping. An example of a system applying beam sweeping is IEEE802.11ad, the Wi-Fi standard operating in the unlicensed 60 GHz band.

If a user equipment is supposed to receive signals from a neighbour AN, which signals are transmitted using beam sweeping, it has to listen at all-time instances when the neighbour AN transmits. This is because the user equipment doesn't know when the neighbour AN transmits signals into the correct direction towards the user equipment. If the user equipment has only the capability to receive from a single direction it cannot receive data or signals from its own serving AN during this time which will reduce throughput.

WO2012115553 discloses that a communication device obtains information about an antenna beam of a beam sweeping base station in a cellular communication network. The information relates to when in time a time period starts and the duration of the time period. The communication device will only use the antenna beam during such a time period. When being out of the time period, the communication device refrains from attempting to receive or transmit data using the antenna beam. The document thereby addresses how to minimize the time of effort spent by the communication device to listen to a beam in the serving cell for reducing power consumption in the communication device. However, the document does not address listening to a neighbor (target) cell nor the throughput of the cellular communication network.

SUMMARY

It is therefore an object of embodiments herein to improve throughput in a wireless communication network.

According to a first aspect of embodiments herein, the object is achieved by a method in a wireless communication network for assisting a user equipment to receive signals from a target access node. The wireless communication network comprises the target access node and a serving access node serving the user equipment. The serving access node sends information about time instances scheduled for sending signals from the target access node in a beam direction towards the user equipments to the user equipment and then the user equipment receives signals from the target access node during the time instances indicated in the received information. The time instances are determined either in the target access node or in the serving access node.

According to a second aspect of embodiments herein, the object is achieved by a target access node in a wireless communication network for assisting a user equipment to receive signals from the target access node. The wireless communication network comprises the target access node and a serving access node serving the user equipment. The target access node receives from the serving access node, information about a position of the user equipment. The target access node determines a beam direction towards the user equipment based on received information and its own position. The target access node then determines time instances scheduled for sending signals in the beam direction towards the user equipment and sends information about the time instances to the serving access node which forwards the information to the user equipment.

According to a third aspect of embodiments herein, the object is achieved by a method in a serving access node in a wireless communication network for assisting a user equipment to receive signals from a target access node. The wireless communication network comprises the target access node and the serving access node serving the user equipment. The serving access node receives information about a schedule of the target access node on beam directions versus transmission times and/or a position of the target access node. The serving access node determines time instances scheduled for sending signals from the target access node in a beam direction towards the user equipments based on received information. The serving access node then sends information about the time instances to the user equipment.

According to a fourth aspect of embodiments herein, the object is achieved by a method in a user equipment for receiving signals from a target access node and a serving access node in a wireless communication network. The wireless communication network comprises the target access node and the serving access node serving the user equipment. The user equipment receives from the serving access node information about time instances scheduled for sending signals from the target access node in a beam direction towards the user equipments. The user equipment then receives signals from the target access node during the time instances indicated in the received information.

The object is also achieved by corresponding embodiments of a target access node, a serving access node and a user equipment, respectively.

Since the user equipment receives information from the serving access node about time instances when the user equipment should listen to the target access node, there is no need for the user equipment to listen at all time instances when the target access node transmits. In this way, less time is needed for the user equipment to receive beamformed transmissions from the target access node and leaving more time for data or signal reception from the serving access node. Therefore, the throughput of the wireless communication network is increased and improved.

BRIEF DESCRIPTION OF THE DRAWINGS

Examples of embodiments herein are described in more detail with reference to attached drawings in which.

DETAILED DESCRIPTION

Figure 1:
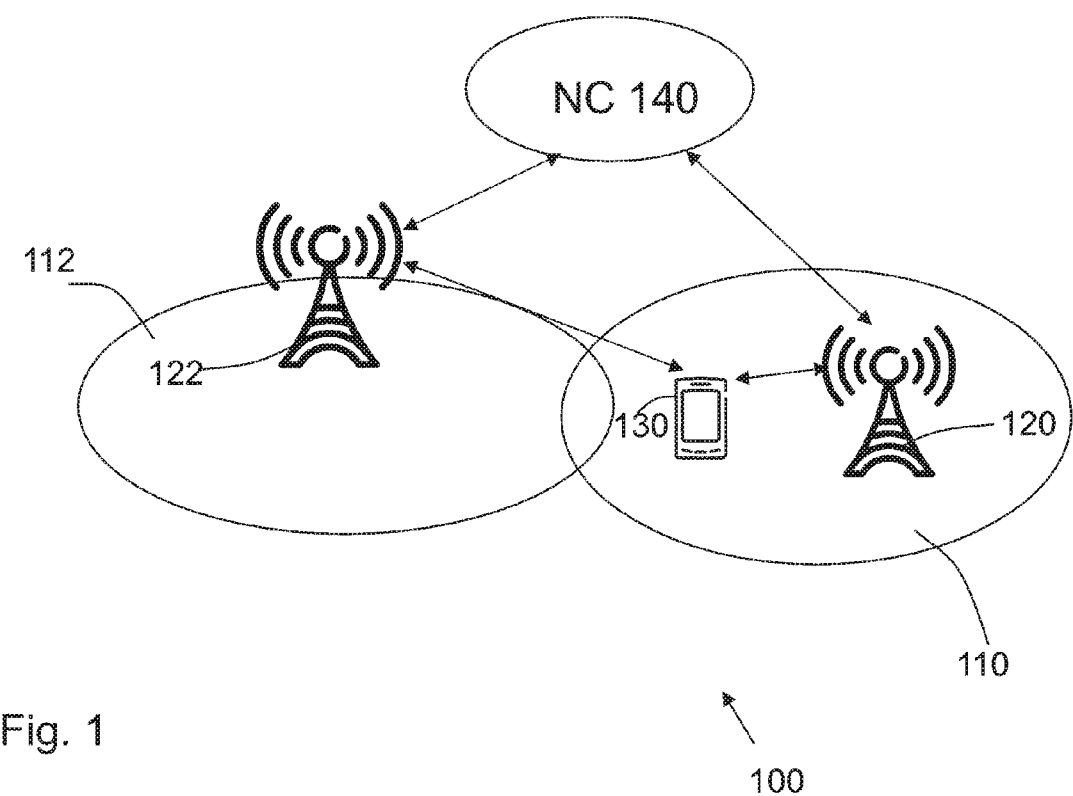
FIG. 1 is a schematic block diagram illustrating embodiments of a wireless communication network.

FIG. 1 depicts an example of a wireless communication network 100 in which embodiments herein may be implemented. The wireless communication network 100 may be any wireless system or cellular network, such as a Long Term Evolution (LTE) network, any $3^{rd}$ Generation Partnership Project (3GPP) cellular network, Worldwide interoperability for Microwave Access (Wimax) network, Wireless Local Area Network (WLAN/Wi-Fi) etc.

The wireless communication network 100 comprises a plurality of cells whereof two, a first cell 110 comprises a first Access Node (AN) 120 and a second cell 112 comprises a second Access Node 122 are depicted in FIG. 1. The first Access Node 120, the second Access Node 122 are network access nodes which each may be, for example, an eNB, an eNodeB, or an Home Node B, an Home eNode B, a Relay, or any other network access node capable to serve a user equipment or a machine type communication device in a wireless communication network. The first Access Node 120 serves the first cell 110, the second Access Node 122 serves the second cell 112.

A user equipment 130 operates in the wireless communication network 100. The first Access Node 120 is a serving AN serving the user equipment 130, the second Access Node 122 is a target AN for the user equipment 130.

The user equipment 130 may e.g. be a wireless device, a mobile wireless terminal or a wireless terminal, a mobile phone, a computer such as e.g. a laptop, a Personal Digital Assistants (PDAs) or a tablet computer, sometimes referred to as a phablet, with wireless capability, a sensor or actuator with wireless capabilities or any other radio network units capable to communicate over a radio link in a wireless communication network. Please note the term user equipment used in this document also covers other wireless devices such as Machine to machine (M2M) devices.

The wireless communication network may further comprise a Network Controller 140 which communicates with the first and second access nodes and acts as a handling unit or a controller for different Radio Access Technologies.

Figure 2:
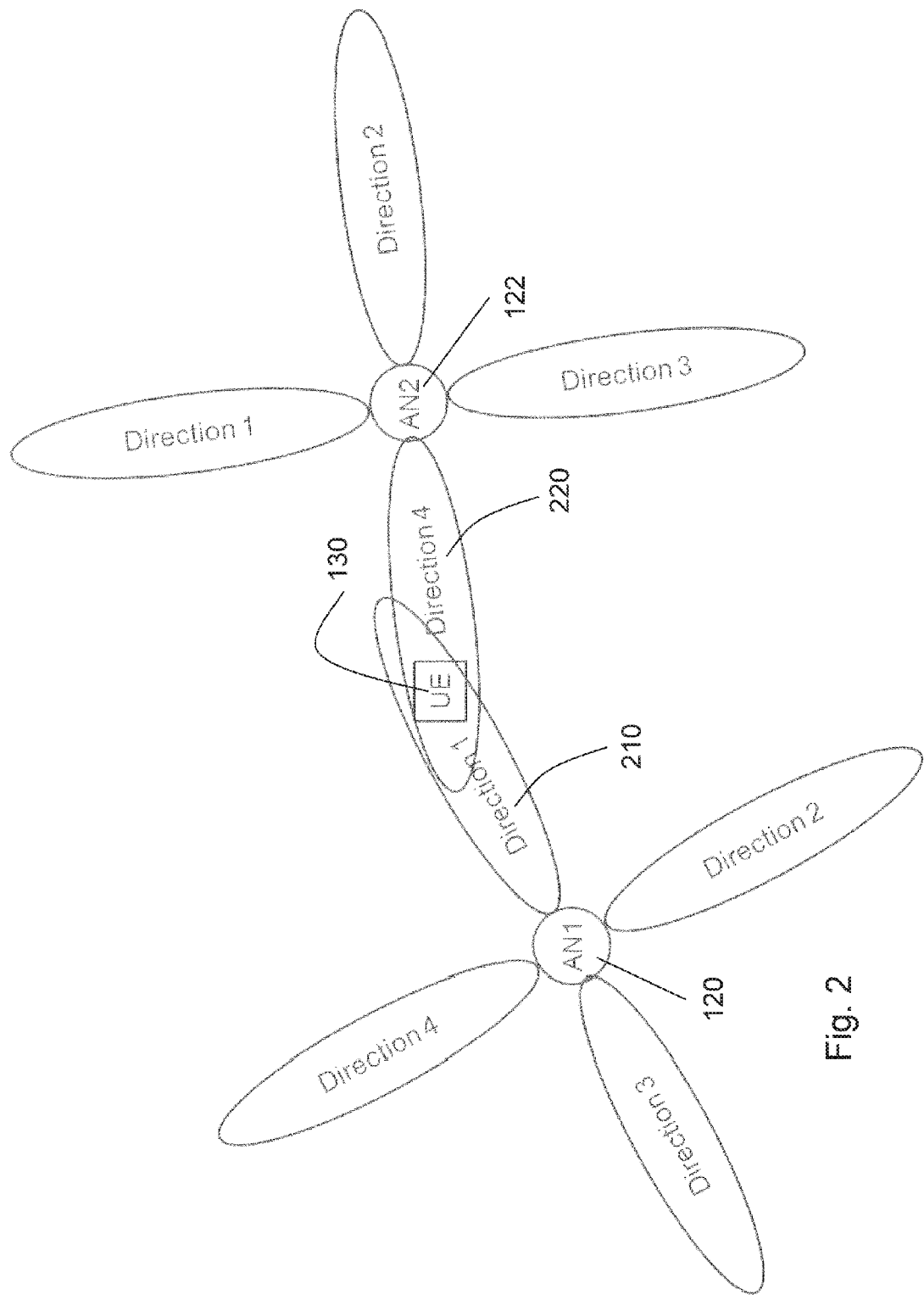
FIG. 2 is a schematic diagram illustrating beam directions of access nodes.

FIG. 2 shows beam directions for the first access node referred to as AN1 and being the serving access node 120, and the second access node referred to as AN2 and being the target access node 120. For example, AN1 has four beam directions, wherein Direction 1 with reference number 210 is a beam direction towards the user equipment 130. The user equipment 130 needs to measure on beams transmitted by AN2 (the target AN). Based on the user equipment 130 position and the target AN own position, the target AN can determine that the best beam direction which covers the user equipment 130 is Direction 4 with reference number 220. The target AN (AN2) can then inform the serving AN (AN1) at which time instances AN2 transmits in Direction 4.

Figure 3A:
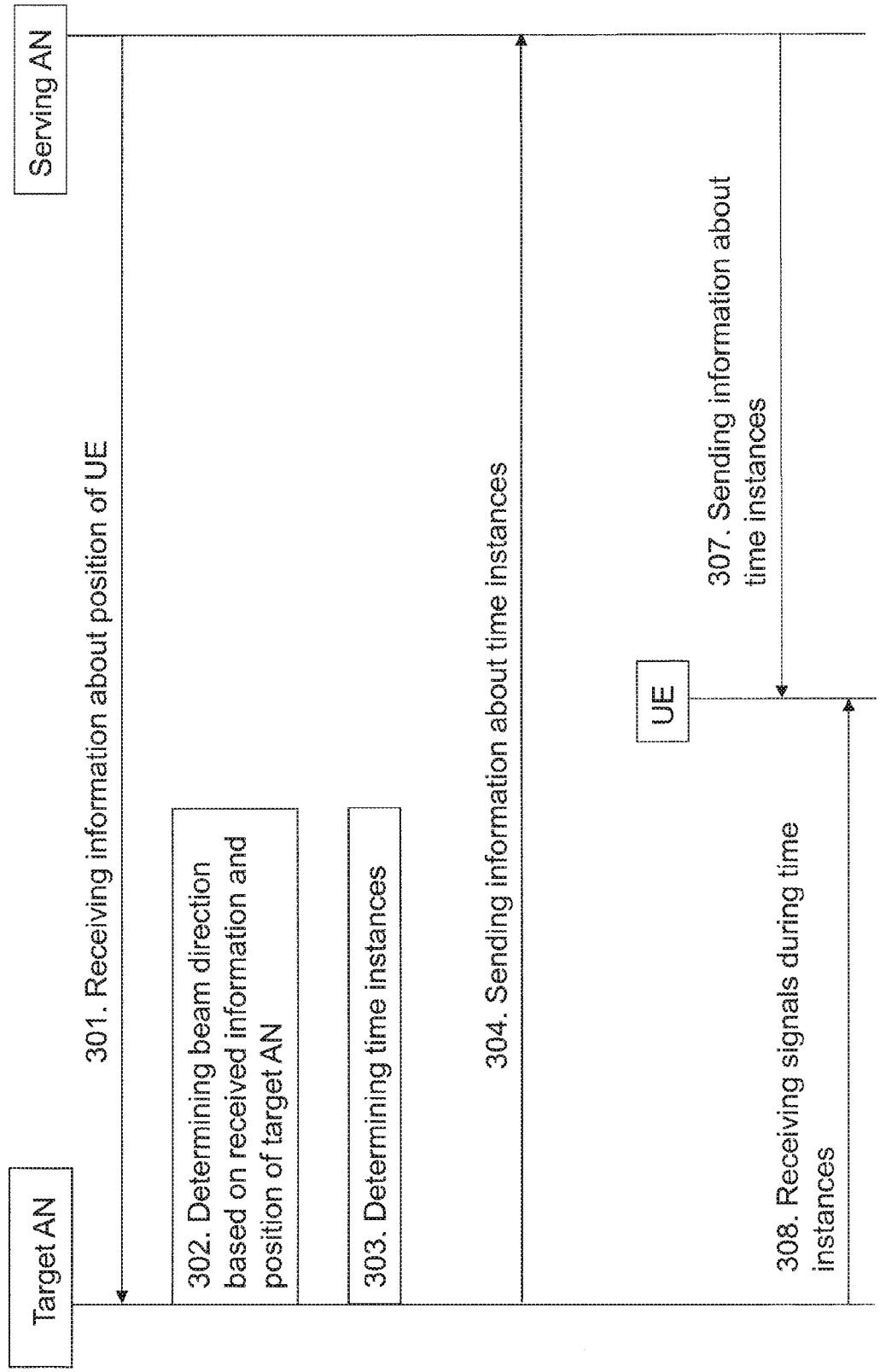
FIG. 3A and 3B are signalling diagrams depicting embodiments of a method in a wireless communication network.

Example of embodiments of a method in the wireless communication network 100 for assisting the UE 130 to receive signals from the target Access Node 122 will now be described with reference to FIG. 3A and FIG. 3B.

According to a first embodiment, the target access node 122 determines the time instances scheduled for sending signals from the target access node 122 in a beam direction 220 towards the user equipments 130. The target access node 122 perform the following actions:

Action 301

The target access node 122 receives from the serving access node 120, information about a position of the user equipment 130.

The information about a position of the user equipment 130 may comprise an exact position of the user equipment 130 or a less exact position of the user equipment 130.

The exact position is typically used when the serving node has a good knowledge about the position of the user equipment 130. The exact position can also be referred to as a more exact position, taking into account that no position in a real life implementation will be exact, since there will always be a certain degree of uncertainty when deciding or defining a position.

The exact position may e.g. be defined by any kind of coordinates, like Cartesian coordinates or some sort of vector coordinates including angles and distance, another example could be GPS coordinates, other ways are of course also conceivable.

The less exact position may also be defined in different ways, one way could be to accompany the coordinates with an indication of uncertainty, or inexactness or accuracy, another could be to accompany the coordinates with an indication of uncertainty for each dimension of the coordinates (e.g one for x, one for y and one for z). Another could be to only supply a limited set of coordinates, like for example to state the beam direction, such as the beam direction 210 of the serving access node 120 serving the user equipment 130, but omitting the exact point on the beam where the device is most likely found. Many other ways could of course be used.

The coordinates/position may have been determined, for example, by the serving access node itself, or by the user equipment which has then communicated its position to the serving node.

Action 302

The target access node 122 determines a beam direction 220 towards the user equipment 130 based on received information and a position of the target access node 122.

Action 303

The target access node 122 determines the time instances scheduled for sending signals in the beam direction 220 towards the user equipment 130.

Action 304

The target access node 122 sends information about the time instances to the serving access node 120.

Figure 3B:
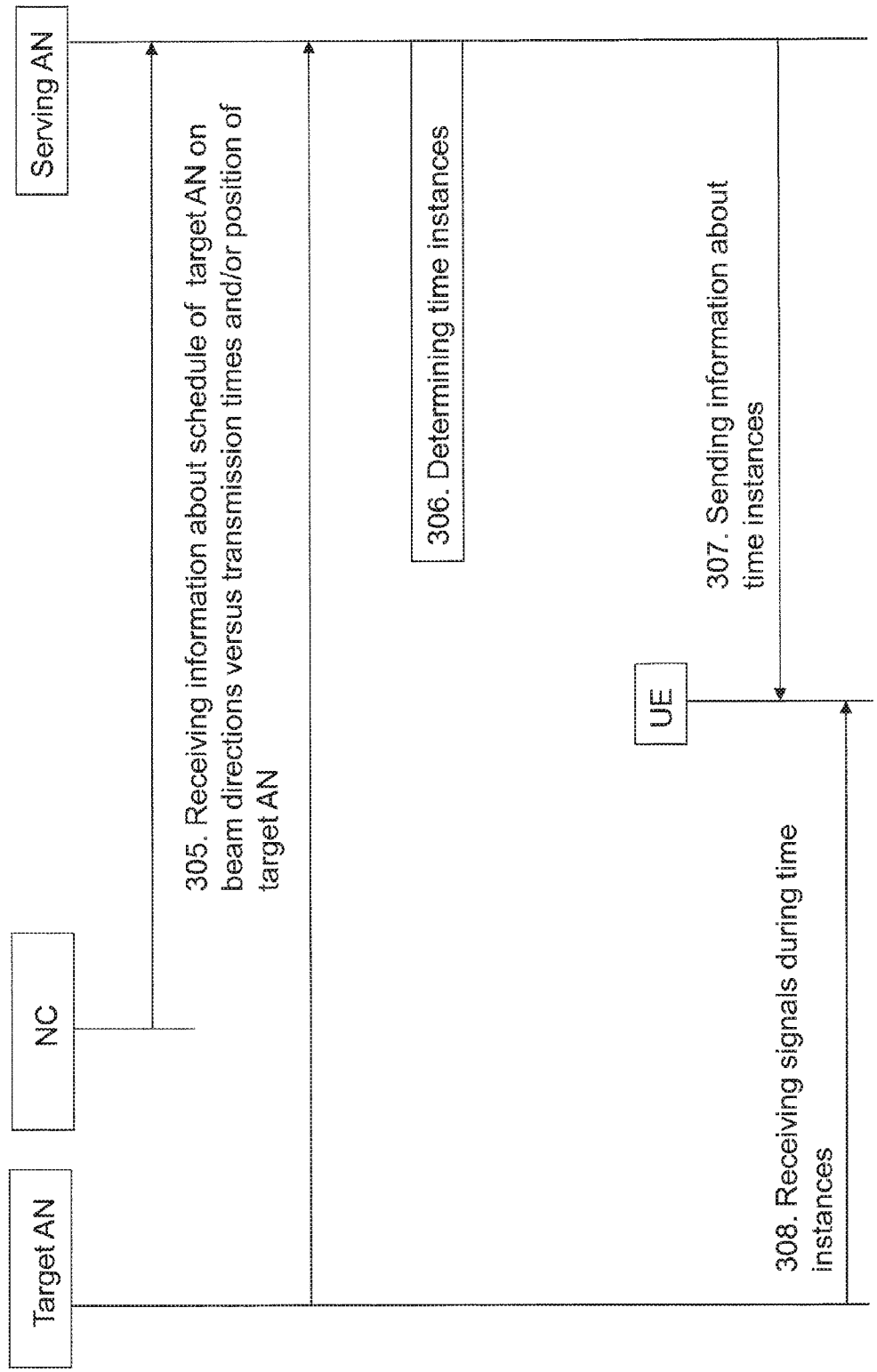

According to a second embodiment, as shown in FIG. 3B, the serving access node 120 determines the time instances and perform the following actions:

Action 305

The serving access node 120 receives information about a schedule of the target access node 122 on beam directions versus transmission times and/or a position of the target access node 122.

Action 306

The serving access node 120 determines the time instances scheduled for sending signals From the target access node 122 in the beam direction 220 towards the user equipments 130 based on received information.

After the time instances are determined, the following actions are performed:

Action 307

The serving access node 120 sends to the user equipment 130, information about the time instances scheduled for sending signals from the target access node 122 in a beam direction 220 towards the user equipments 130.

Action 308

The user equipment 130 receives signals from the target access node 122 during the time instances indicated in the received information.

The embodiments will now be described more in detail. If the serving access node 120 is aware of the user equipment 130 position, the serving access node 120 may forward the user equipment 130 position to the target access node 122. This relates to Action 301 above. The target access node 122 can, together with its own position, determine which is the likeliest, or few likeliest, beam direction(s) hearable by the user equipment 130. This relates to Action 302 above. The target access node 122 may then determine time instances (Action 303 above) when it will transmit into this/these direction(s) and send information about the time instances (Action 304 above) to the serving access node 120 and which in turn informs the user equipment 130 (Action 307 above). The use equipment 130 may not need to listen at time instances scheduled for beam transmissions from the target access node 122 into all other directions but only at the time instances indicated.

If the position of the user equipment 130 is not available, the serving access node 120 may forward its own beam direction, such as the direction of the beam 210 with which it serves the user equipment 130 to the target access node 122. Based on the beam direction 210 and the position of the serving access node 120, the target access node 122 can still determine the likeliest beam direction(s) together with the position of the target access node 122, and then forward information about time instances and/or beam direction to the serving access node 120.

The serving access node 120 may of course forward both the user equipment position and the serving beam direction to the target access node 122, if the user equipment 130 location is available. The serving access node 120 may also forwards its own position to the target access node 122 but it typically happens once during the access node setup.

Figure 4:
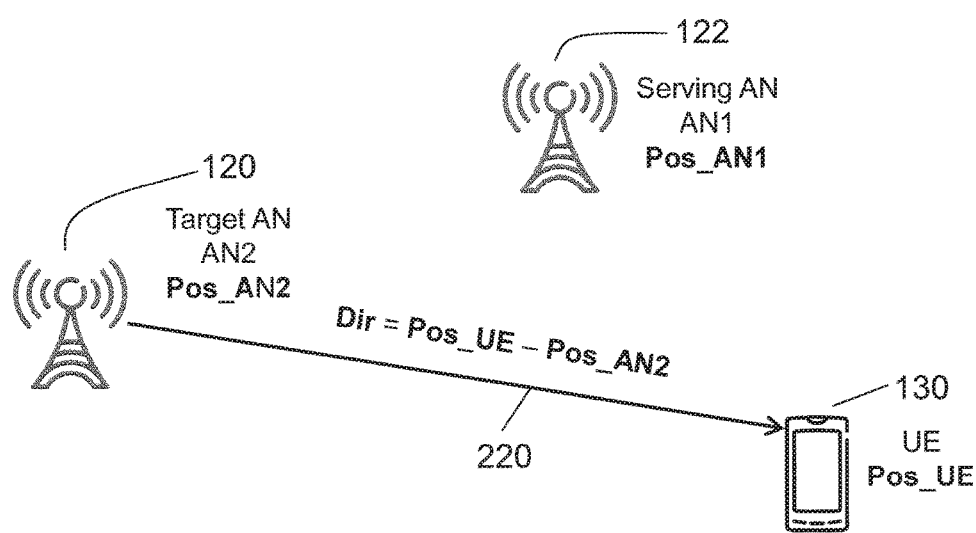
FIG. 4 is a schematic diagram illustrating one embodiment of a method to determine a beam direction.

Determining the likeliest beam direction based on the target access node 122 position and the user equipment position or the serving access node 120 beam direction can be e.g. based on Line-Of-Sight (LOS) calculations. For Ultra-Dense-Networks (UDN), the density of access node is very dense, LOS is a likely propagation condition, therefore LOS will be often present. FIG. 4 shows a scheme to determine a beam direction 220 using LOS calculation:

$$Dir = Pos\_UE - Pos\_AN2 \qquad \text{Eq. 1}$$

Where in FIG. 4 and Eq. 1, Pos_AN1 is Position and/or coordinates of the AN1, Pos_AN2 is Position and/or coordinates of the AN2, Pos_UE is Position and/or coordinates of the UE 130 and Dir is Direction from the AN2 to the UE 130, that is the beam direction with reference number 220 indicated in FIG. 4.

If the UE 130 does not find the beam of the target access node 122, it must search in all directions. However, in most cases, this is not needed.

As described above according to the first embodiment, it is the target access node 122, such as the second access node AN2 that determines at which time instances the user equipment 130 should listen to or receive signals from the target access node 122. According to the second embodiment, If the serving access node 120 knows the schedule of the target access node 122 on beam directions versus transmission times (Action 305), and the position of the target access node 122, the serving access node 120 can also determine the time instances (Action 306) at which the user equipment 130 should listen to beams or receive signals from the target access node 122. Information about the schedule of the target access node 122 on beam directions versus transmission times may be received from the target access node 122 or from the network controller NC140.

As described above, the user equipment 130 receives information from the serving access node 120 about time instances when the user equipment should listen to the target access node 122, no matter how the time instances are determined. Thus, the user equipment 130 get assistance for handling or receiving signals from the target access node applying beamforming. There is no need for the user equipment 130 to listen at time instances scheduled for beam transmissions from the target access node into all other directions but only at the time instances indicated in the received information. In this way, less time is needed for the user equipment 130 to receive beamformed transmissions from the target access node 122 and leaving more time for data or signal reception from the serving access node 120. Therefore, the throughput of the wireless communication network is increased and improved.

Figure 5:
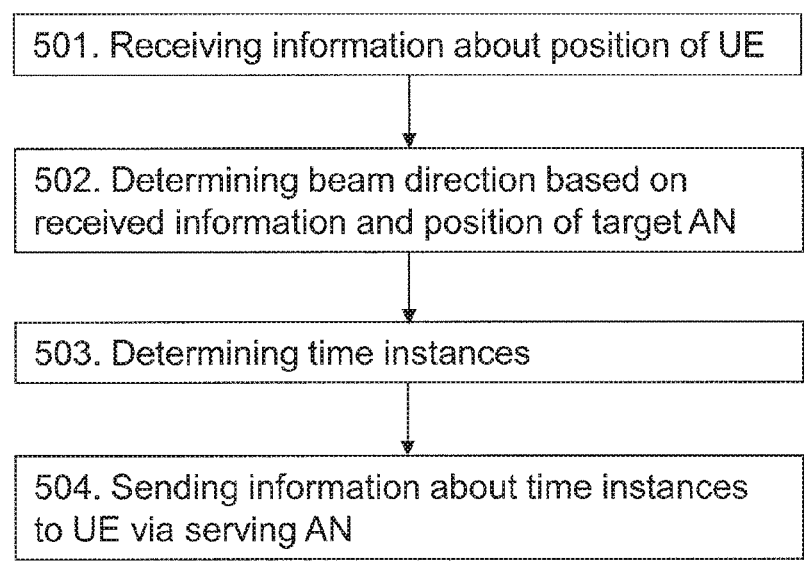
FIG. 5 is a flowchart depicting one embodiment of a method in a target access node.

Example of embodiments of a method in a target access node 122 in a wireless communication network 100 for assisting a user equipment 130 to receive signals from the target Access Node 122 will now be described with reference to FIG. 5. The method comprises the following actions, where Actions 501-503 are the same as Actions 301-303 performed by the target access node 122 to determine the time instances:

Action 501

The target access node 122 receives from the serving access node 120, information about a position of the user equipment 130, Action 502

The target access node 122 determines a beam direction 220 towards the user equipment 130 based on received information and a position of the target access node 122.

Action 503

The target access node 122 determines the time instances scheduled for sending signals in the beam direction (220) towards the user equipment (130).

Action 504

The target access node 122 sends information about the time instances to the serving access node 120 which typically forwards the information to the user equipment 130.

Figure 6:
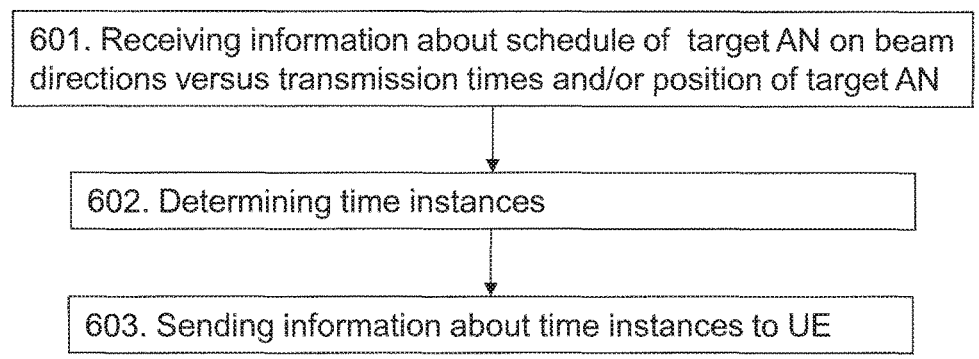
FIG. 6 is a flowchart depicting one embodiment of a method in a serving access node.

Example of embodiments of a method in a serving access node 120 in a wireless communication network 100 for assisting a user equipment 130 to receive signals from the target Access Node 122 will now be described with reference to FIG. 6. The method comprises the following actions, where Actions 601-602 are the same as Actions 305-306 performed by the serving access node 120 to determine the time instances:

Action 601

The serving access node 120 receives information about a schedule of the target access node 122 on beam directions versus transmission times and/or a position of the target access node 122.

Action 602

The serving access node 120 determines the time instances scheduled for sending signals from the target access node 122 in the beam direction 220 towards the user equipments 130 based on received information.

Action 603

The serving access node 120 sends information about the time instances to the user equipment 130.

Figure 7:
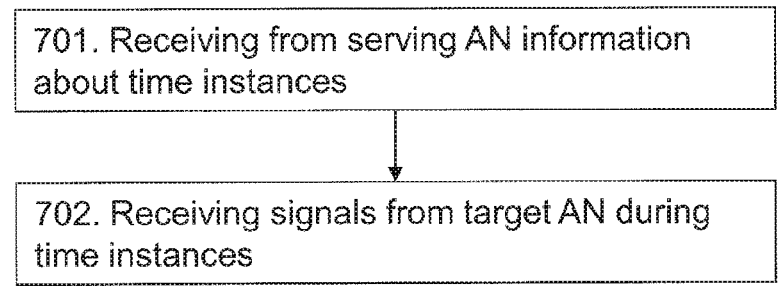
FIG. 7 is a flowchart depicting one embodiment of a method in a user equipment.

Example of embodiments of a method in a user equipment 130 for receiving signals from a target access node 122 and a serving access node 120 in a wireless communication network 100 will now be described with reference to FIG. 7. The method comprises the following actions:

Action 701

The user equipment 130 receives from the serving access node 120 information about time instances scheduled for sending signals from the target access node 122 in a beam direction 220 towards the user equipments 130.

Action 702

The user equipment 130 receives signals from the target access node 122 during the time instances indicated in the received information.

Figure 8:
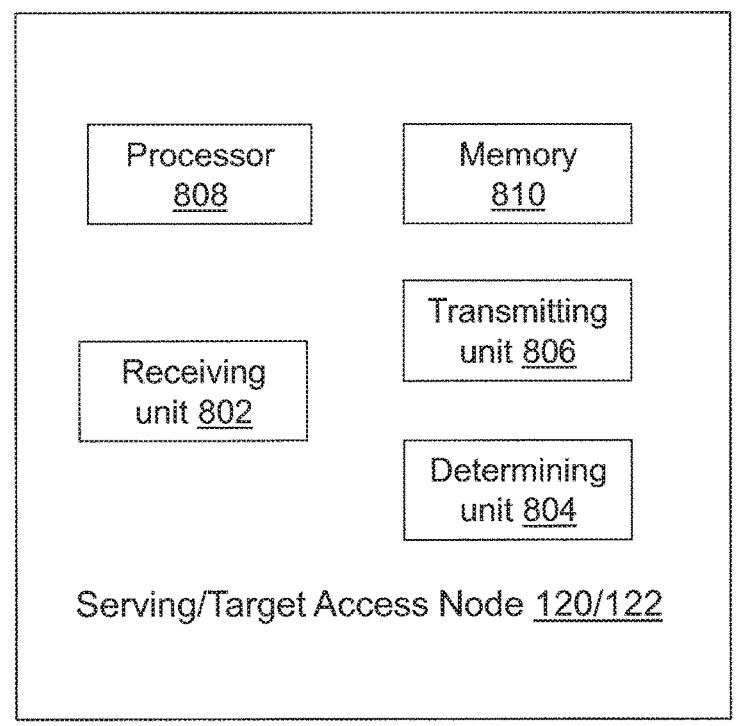
FIG. 8 is a schematic block diagram illustrating embodiments of an access node.

To perform the methods actions in the target access node 122 and the serving access node 120 for assisting the user equipment 130 to receive signals from the target access node 122 in the wireless communication network 100 described above in relation to FIGS. 5 and 6, the target/serving access node 122/120 comprises circuits or units as depicted in FIG. 8. The target access node 122 and the serving access node 120 basically have the same structure and each comprises similar units, such as a receiving unit 802, a determining unit 804, a transmitting unit 806, a processor 808 and a memory 810, where each unit may be configured differently to perform different functions.

For the target access node 122, the receiving unit 802 is configured to receive from the serving access node 120, information about a position of the user equipment 130. The determining unit 804 is configured to determine a beam direction 220 towards the user equipment 130 based on received information and a position of the target access node 122 and is further configured to determine time instances scheduled for sending signals in the beam direction 220 towards the user equipment 130. And the transmitting unit 806 is configured to send information about the time instances to the serving access node 120 which typically forwards the information to the user equipment 130.

For the serving access node 120, the receiving unit 802 is configured to receive information about a schedule of the target access node 122 on beam directions versus transmission times and/or a position of the target access node 122; the determining unit 804 is configured to determine time instances scheduled for sending signals from the target access node 122 in a beam direction 220 towards the user equipments 130 based on received information; and the transmitting unit 806 is configured to send information about the time instances to the user equipment 130.

Figure 9:
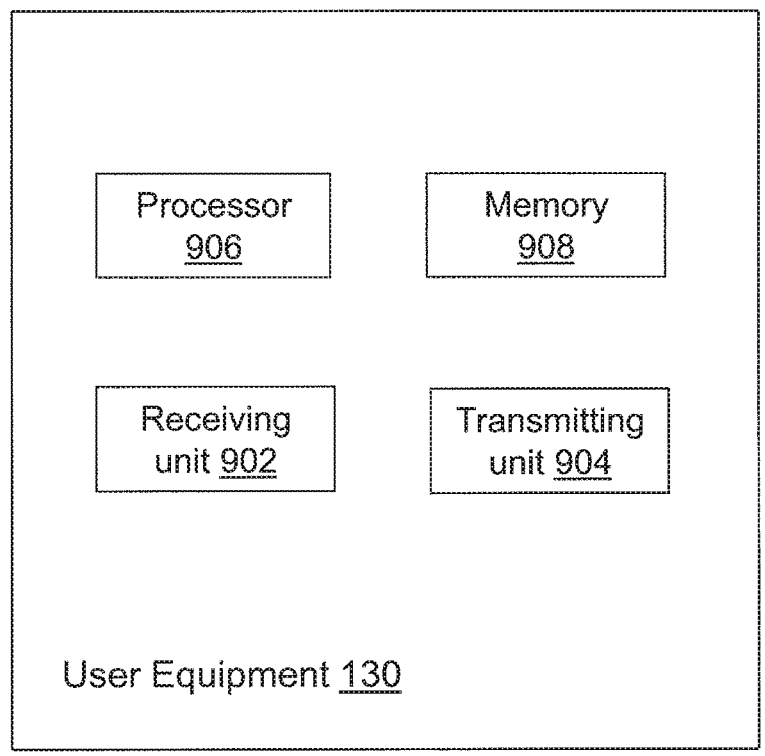
FIG. 9 is a schematic block diagram illustrating embodiments of a user equipment.

To perform the method actions in a user equipment 130 for receiving signals from a target access node 122 and a serving access node 120 in a wireless communication network 100 described above in relation to FIG. 7, the user equipment 130 comprises circuits or units depicted in FIG. 9. The user equipment 130 comprises a receiving unit 902, a transmitting unit 904, a processor 906 and a memory 908. The receiving unit 902 is configured to receive from the serving access node 120 information about time instances scheduled for sending signals from the target access node 122 in a beam direction 220 towards the user equipments 130. The receiving unit 902 is further configured to receive signals from the target access node 122 during the time instances indicated in the received information.

Those skilled in the art will also appreciate that the receiving unit 802, the determining unit 804 and the transmitting unit 806 described above in the access node may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for assisting the user equipment 130 to receive signals from the target Access Node 122 in a wireless communication network 100, may be implemented through one or more processors, such as the processor 808 in the target/serving access node, the processor 906 in the user equipment 130, together with computer program code for performing the functions and actions of the embodiments herein. The program code mentioned above may also be provided as a computer program product, for instance in the form of a data carrier carrying computer program code for performing the embodiments herein when being loaded into the target/serving access node 122/120 and the user equipment 130. One such carrier may be in the form of a CD ROM disc. It is however feasible with other data carriers such as a memory stick. The computer program code may furthermore be provided as pure program code on a server and downloaded to the target/serving access node 122/120 and the user equipment 130.

The memory 810 in the target/serving access node and the memory 908 in the user equipment 130 may comprise one or more memory units and may be arranged to be used to store received information, measurements, data, configurations and applications to perform the methods herein when being executed in the target/serving access node 122/120 and the user equipment 130.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a wireless communication network for assisting a user equipment in a serving cell served by a serving access node to receive signals from a target access node, wherein the wireless communication network comprises the target access node, the user equipment and the serving access node serving the user equipment, the method comprising:
receiving, in the serving access node, in connection with a handover of the user equipment from the serving access node to the target access node, first information about a schedule of the target access node on beam directions versus transmission times and a position of the target access node, wherein the first information is received from the target access node and wherein the first information includes the beam direction from the target access node towards the user equipment;
determining, in the serving access node, time instances scheduled for sending signals from the target access node in the beam direction towards the user equipment based on the schedule of the target access node on beam directions versus transmission times, the position of the target access node and the beam direction from the target access node towards the user equipment;
sending from the serving access node to the user equipment, second information about time instances scheduled for sending signals from the target access node in a beam direction towards the user equipment;
transmitting signals from the target access node during the time instances indicated in the second information; and
receiving in the user equipment the signals from the target access node during the time instances indicated in the second information, wherein the time instances are determined in the serving access node.

2. A method in a serving access node in a wireless communication network for assisting a user equipment served by the serving access node in a serving cell to receive signals from a target access node, wherein the wireless communication network comprises the target access node and the serving access node serving the user equipment, the method comprising:
receiving, from the target access node, in connection with a handover of the user equipment from the serving access node to the target access node, information about a schedule of the target access node on beam directions versus transmission times and a position of the target access node, and wherein the information includes a beam direction from the target access node towards the user equipment;
determining time instances scheduled for sending signals from the target access node in the beam direction towards the user equipment based on the schedule of the target access node on beam directions versus transmission times, the position of the target access node and the beam direction from the target access node towards the user equipment; and
sending information about the time instances from the serving access node to the user equipment.

3. A serving access node in a wireless communication network for assisting a user equipment served by the target access node in a serving cell to receive signals from a target access node, wherein the wireless communication network comprises the target access node and the serving access node serving the user equipment, the serving access node comprising:
a receiving unit configured to receive, from the target access node, in connection with a handover of the user equipment from the serving access node to the target access node, information about a schedule of the target access node on beam directions versus transmission times and a position of the target access node, and wherein the information comprises a beam direction from the target access node towards the user equipment;
a determining unit configured to determine time instances scheduled for sending signals from the target access node in the beam direction towards the user equipment based on the schedule of the target access node on beam directions versus transmission times, the position of the target access node and the beam direction from the target access node towards the user equipment; and
a transmitting unit configured to send information about the time instances to the user equipment from the serving access node.

* * * * *